No. 816,350. PATENTED MAR. 27, 1906.
H. W. MORGAN.
NAILING MACHINE.
APPLICATION FILED JUNE 20, 1900.

No. 816,350.  
PATENTED MAR. 27, 1906.

H. W. MORGAN.  
NAILING MACHINE.  
APPLICATION FILED JUNE 20, 1900.

No. 816,350. PATENTED MAR. 27, 1906.
H. W. MORGAN.
NAILING MACHINE.
APPLICATION FILED JUNE 20, 1900.

Witnesses.
Willard Rich.
Walter B. Payne.

Inventor
Henry W. Morgan
by Church & Church
his Attorneys

No. 816,350. PATENTED MAR. 27, 1906.
H. W. MORGAN.
NAILING MACHINE.
APPLICATION FILED JUNE 20, 1900.

UNITED STATES PATENT OFFICE.

HENRY W. MORGAN, OF ROCHESTER, NEW YORK.

NAILING-MACHINE.

No. 816,350.　　　Specification of Letters Patent.　　Patented March 27, 1906.

Application filed June 20, 1900. Serial No. 20,980.

*To all whom it may concern:*

Be it known that I, HENRY W. MORGAN, of Rochester, in the county of Monroe and State of New York, have invented certain new and useful Improvements in Nailing-Machines; and I do hereby declare the following to be a full, clear, and exact description of the same, reference being had to the accompanying drawings, forming a part of this specification, and to the reference characters marked thereon.

My present invention relates to nailing-machines, and has for its object to provide a machine adapted particularly for forming the cleated or made-up ends or sides of boxes and in which the cleats are fed automatically and nailed to the material forming said side or end portions, and it embodies such a construction and arrangement of the parts that the nailing may be performed independently and the cleats fed automatically into position only when desired.

To these and other ends the invention consists in certain improvements in construction and combinations of parts, all as will be hereinafter fully described, the novel features being pointed out in the claims at the end of this specification.

In the drawings.

Similar reference-characters indicate similar parts.

Figure 4:
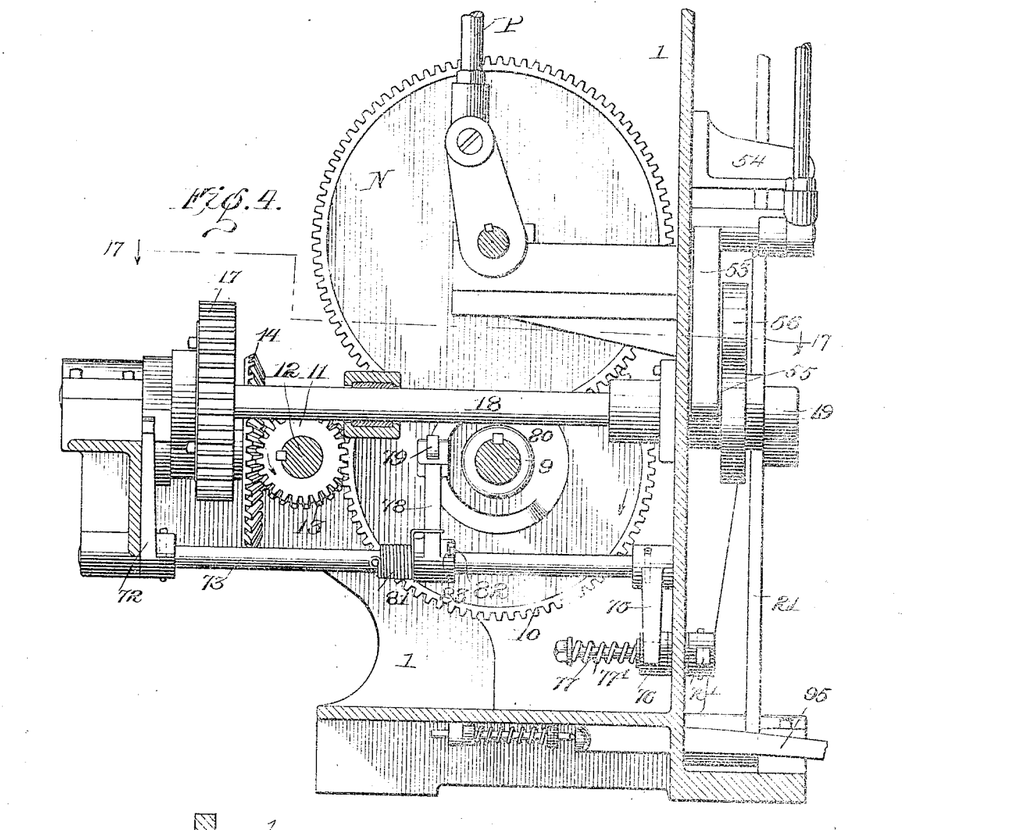
Fig. 4 is an enlarged detail view of the driving mechanism.
Figure 5:
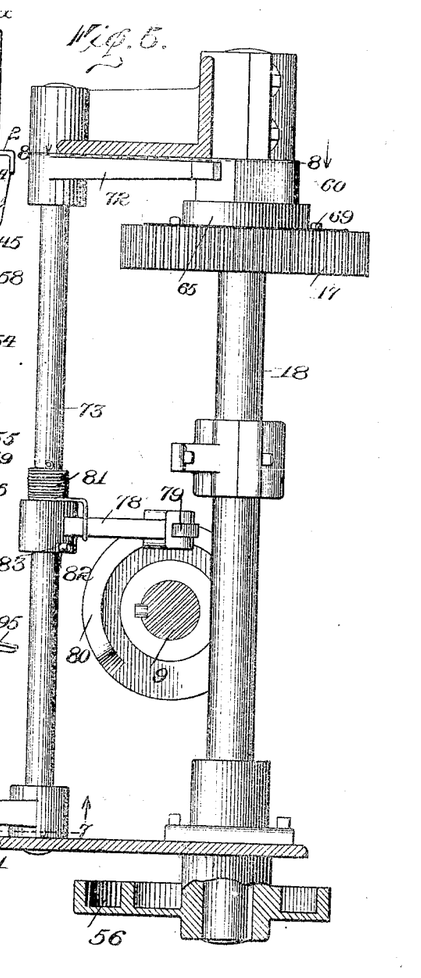
Fig. 5 is a similar view of the cleat-feeding operating mechanism, showing the operating-cam in section.
Figure 6:
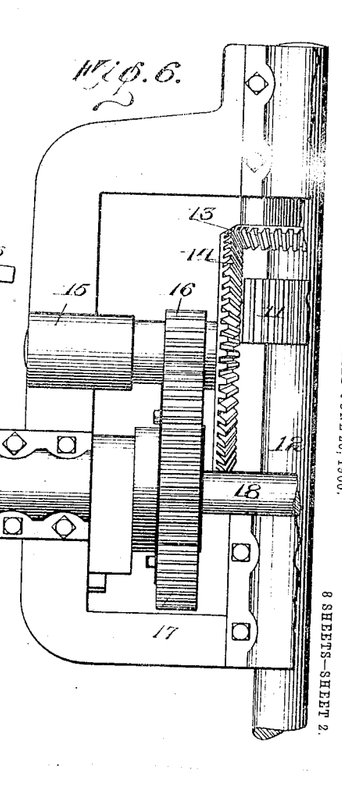
Fig. 6 is a plan view of a portion of the operating mechanism.
Figure 17:
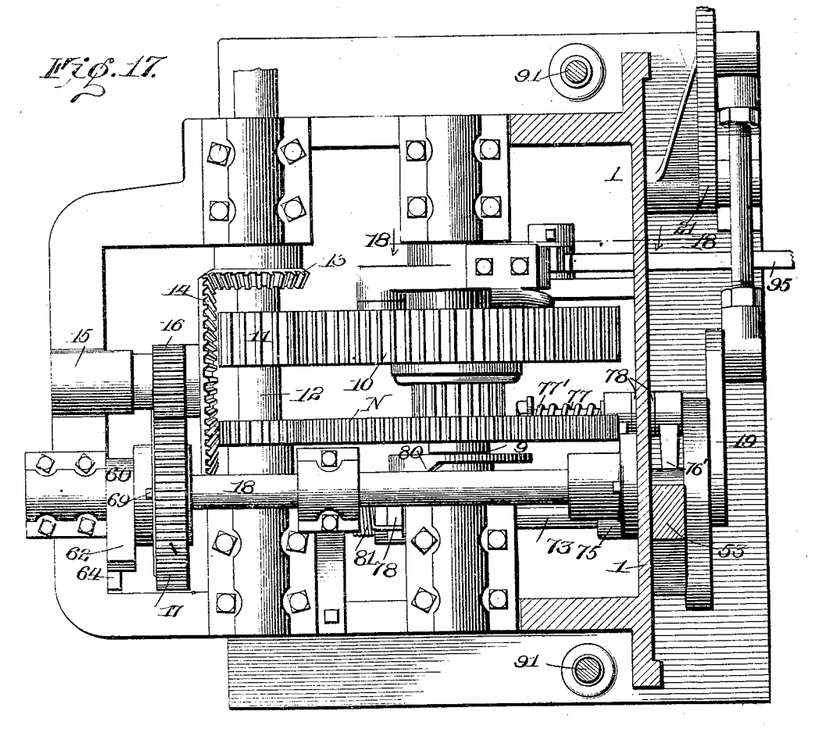
Fig. 17 is a top plan view of the operating mechanism on the line 17 17 of Fig. 4.
Figure 18:
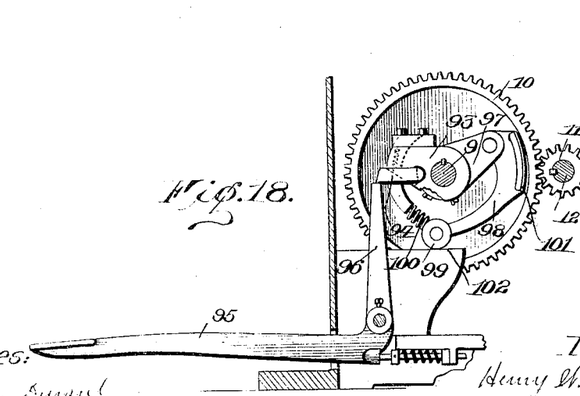
Fig. 18 is a sectional view on the line 18 18 of Fig. 17.

My improved cleat-feeding device is capable of being applied to and operated upon nailing-machines of the general type contained in my prior patent, No. 586,711, consisting, preferably, of the main frame 1, supporting the nail-driving devices and having mounted thereon the stationary table or work-support 2, above which is arranged the supports 3 for the nail-chucks 4 and the vertically-movable driving-head 5, mounted on the guides 6 and carrying the nail-drivers $5^{\times}$, operating in the chucks. The nail-pan devices for feeding the nails singly and delivering them to the chucks have been omitted, and only the operating gear-wheel N and the pitman P for tilting the pan have been shown, as their construction and operation have been clearly described in my former patent. These devices are adapted to be operated in connection with the driving-head 5, and the latter is connected by the rods 7 to cranks 8 on the driven shaft 9, operated by the gear 10, meshing with the pinion 11 on the continuously-moving driving-shaft 12, Figs. 4 and 17. The gear 10 intermittently actuates the driven shaft 9 and is attached thereto by the clutch mechanism described in my former patent embodying the sleeve 93, rigidly secured to the shaft 9 and carrying a clutch-key adapted to engage suitable recesses in the hub of the gear 10, having upon its end an arm 94, which when in the position of rest is normally engaged by an arm 96 on the lever 95, allowing the gear 10 to revolve freely. The sleeve 93 is further provided with an extension 97, to which is pivoted one end of a friction-clutch or brake-lever 98, having upon its opposite end a roller 99, said end being forced outward by a spring 100, arranged between it and the sleeve 93, to cause the engagement of a shoe 101 with the overhanging edge or rim on the gear 10. A shoulder 102 is provided on the frame, with which the roller 99 engages to release the brake when the arm 94 is arrested by the arm 96, as shown in Fig. 18. This arrangement of devices prevents the independent movement of the driving-shaft and the gear 10, causing them to operate together, preventing the weight of the drivers from causing the shaft to race ahead when the cranks 8 are above the center, as it will be seen from the above that as soon as the arm 94 is released and the shaft begins to move the end of the brake-lever leaves the shoulder 102 and engages the gear 10. Also mounted upon the driving-shaft 12 is a bevel-pinion 13, meshing with a bevel-gear 14, supported in the bearing 15 and having upon its rear side the small pinion 16, engaging the gear 17, which latter is mounted upon or forms part of a driving-clutch connection adapted to operate the shaft 18 to cause the operation of the cleat-feeding mechanism, by means of which the cleats are fed into position on the table beneath the nail-chucks to enable the veneer forming the box end or side to be positioned thereon and secured thereto when the nail-chucks descend, as will be more fully described. The cleat-feeding devices are operated relatively to the movement of the nailing devices by means operated intermittently by the driving-shaft 12, said movement being controlled by means operated by the driven shaft 9.

Mounted upon the end of the shaft 18 and in front of the face of the frame 1 is a crank 19, to the end of which is attached a rod 20, connected to an arm 21, pivoted at its lower end at 22 to the frame and connected at its upper end with the feeding-arm 23, said arm being constructed of the parallel bars, at the outer ends of which are arranged rollers 24, journaled on a pin 25 and operating on tracks 26, provided beneath the cleat support or extension 30, formed at the side of the table or work-support.

Figures 2, 11:
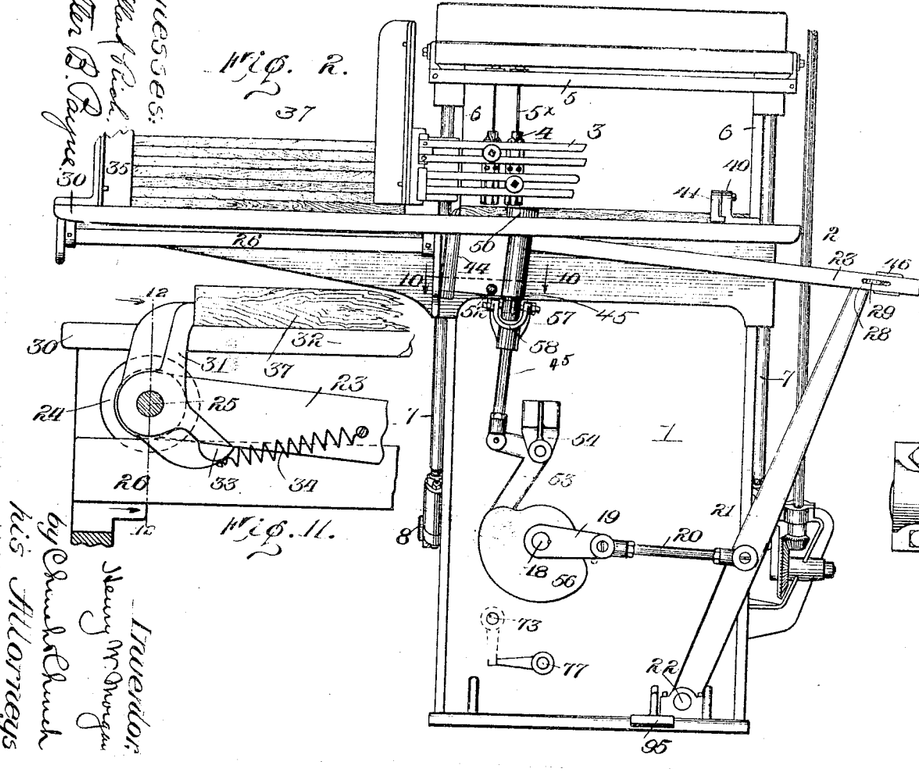
Fig. 2 is a similar view showing a cleat fed into position.
Fig. 11 is a side elevation of the feeding-finger on the cleat-feeding arm.
Figure 3:
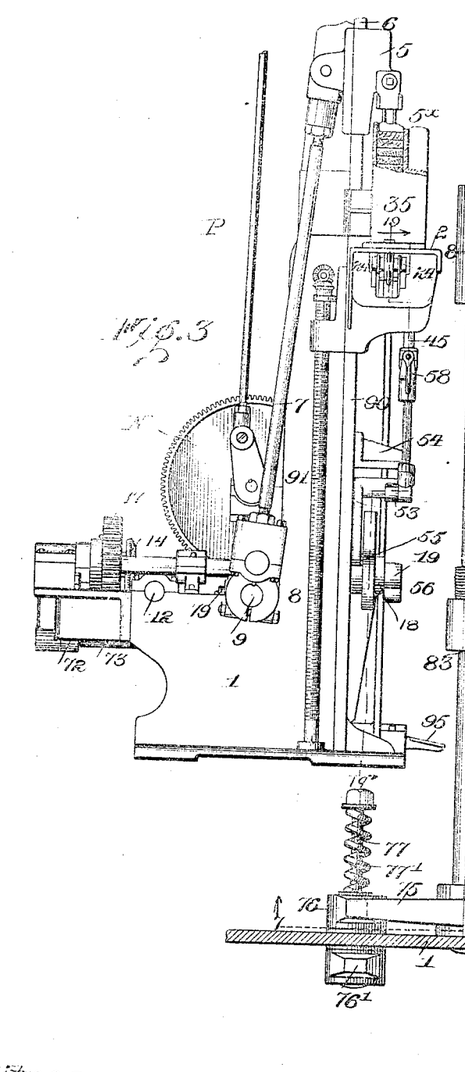
Fig. 3 is a side elevation of the machine.

31 indicates a feeding-finger operating through a slot 32 in the extension 30, pivoted on the pin 25 between the rollers 24 and having the extension at its lower end provided with the stops 33, engaging the lower sides of the bars 23 and held in engagement therewith by means of a spring 34, as shown in Fig. 11, permitting the finger as it is returned after each feeding operation to be depressed when it passes beneath the pile of material to engage another cleat.

Instead of a rigid connection between the bars 23, forming the feeding-arm, and the arm 21 I allow a slight movement of the parts to accommodate any inequalities in the length of the cleats. In the arms 23 I form slots 27, in which the ends of the pivot-pin 28 on the arm 21 operate, and in the rear of said pin are guides 29, formed upon or secured to the block 46, and between the end of the latter and the ends of the arms 23 is a spring 47, normally holding the pin in the forward position in the slot, but permitting its rearward movement when a longer cleat has been fed and arrested by the stop 40.

Figures 1, 7, 13, 15:
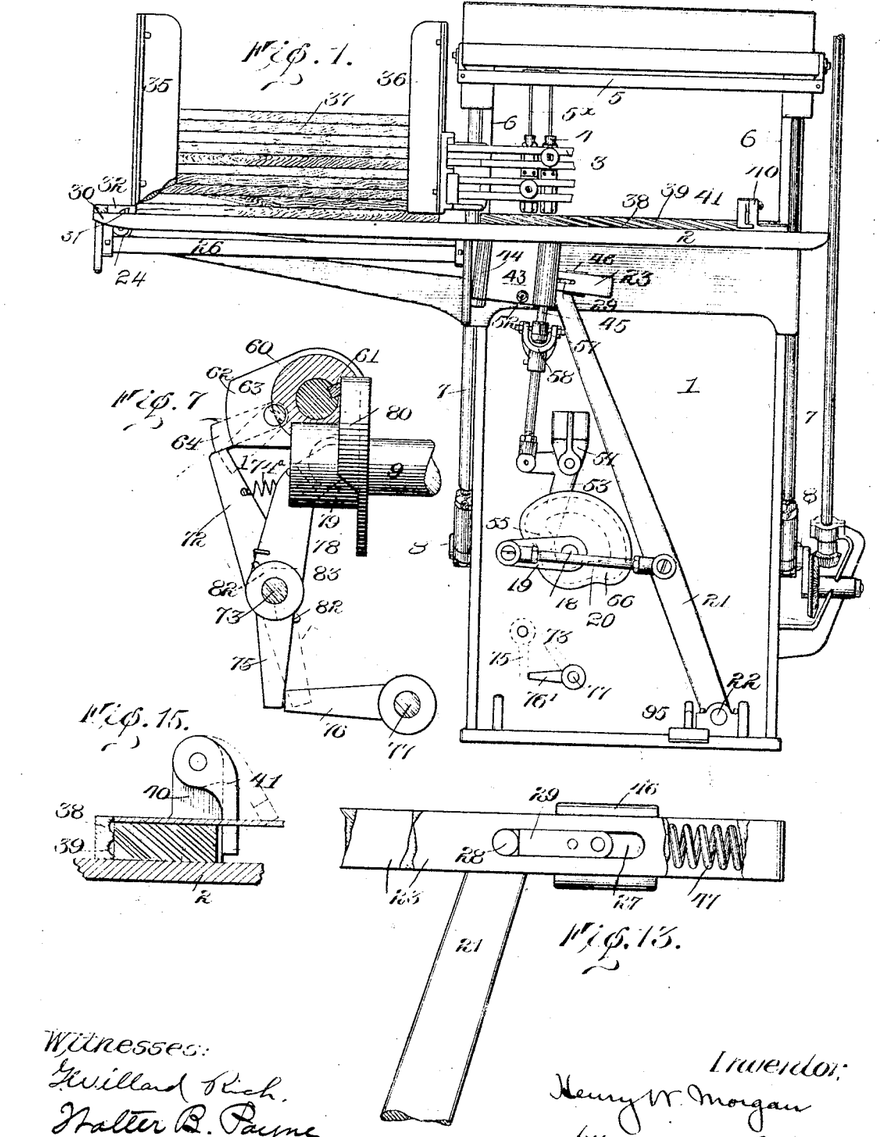
Figure 1 is a front elevation of a nailing-machine constructed in accordance with my invention, showing the parts in the normal position, the nail-pan and feeding devices being omitted.
Fig. 7 is a sectional view on the line 7 7 of Fig. 5.
Fig. 13 is a side elevation of a detail of the feeding-arm.
Fig. 15 is a side elevation of the cleat-stop.
Figure 19:
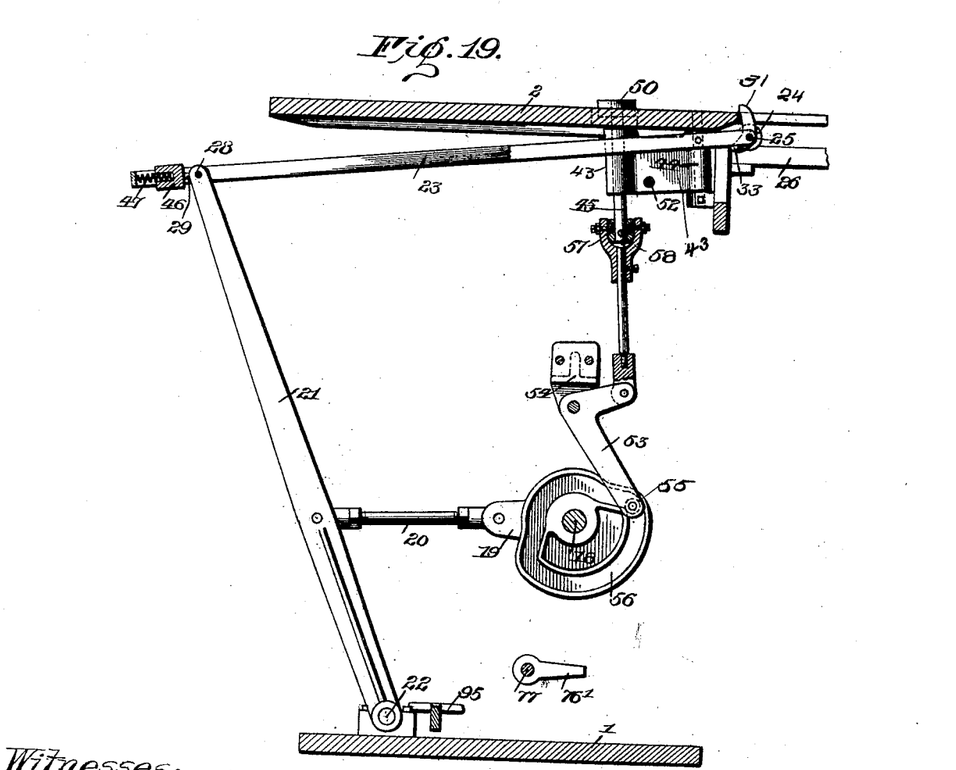
Fig. 19 is a sectional view on the line 19 19 of Fig. 3.

Arranged upon the inner and outer ends of the table extension 30 are the guides or holders 35 and 36, the bottom edge of the latter being elevated sufficiently above the top of the table to permit the passage of a single cleat as it is withdrawn from the bottom of the pile 37. Across the front of the frame and at the rear side of the table is provided a back plate or cleat-guide 38, having grooves 39 extending obliquely across its face from the upper to the lower edge in the direction in which the cleat advances and adapted to cause its forward or advancing end to lie flat against the table. 40 indicates a stop for arresting the movement of the cleat, and when it is desired to secure the cleat with its end projecting beyond the edge of the box side or veneer nailed thereto I provide upon the face of the stop a gage 41, against which the edge of the box side may rest when placed in position by the operator, the end of the cleat engaging the face of the stop and projecting beyond the edge of the box end a distance equal to the thickness of the gage, and by pivoting the latter to the stop the cleat is permitted to be withdrawn after the nailing operation has been completed. Arranged at the opposite end of the table or work-support is a cleat-presser supported upon a wing 43, pivoted at 44 beneath the table, carrying in its outer end a vertically-movable shaft 45 having journaled upon its upper extremity a roller 50, operating through an elongated aperture in the face of the table, said wing being arranged at a slight angle, as shown in Figs. 1, 2, and 19, whereby the roller is inclined slightly in the direction of movement of the cleat to cause the latter to be held firmly against the surface of the table, and a spring 51, arranged on a stud 52, serves to press the roller inwardly against the edge of the cleat, forcing it against the grooved strip or guide 38 at the rear of the table. In order to withdraw the roller from engagement with the cleat to permit the cleat to be removed from the table, I connect the shaft 45 with a bell-crank lever 53, pivoted in the bracket 54 and carrying upon its other end a roller 55, engaging in a cam-groove on the cam-plate 56, mounted upon the shaft 18 and arranged thereon relative the crank-arm 19, so as to cause the roller 50 to be retracted beneath the face of the table after the cleat has been positioned and during the time the feeding-arm 23 is returning to its normal position, as shown in Fig. 1. A universal joint embodying a collar 57, journaled in a yoke 58 and arranged intermediate the bell-crank lever 53 and the wing, permits the latter to move freely upon its pivot 44 as the roller operates against the cleat without binding between the parts.

The shaft 18 may, if desired, be operated continuously from the driving-shaft 12 through the gears 13, 14, 16, and 17; but to permit the operation of the nailing mechanism independently of the cleat-feeding devices I arrange a clutch connection between the gear 17 and the shaft 18, which is under the control of the operator, and also a friction driving connection between the gear and the clutch, whereby if the movement of any of the parts is arrested—as, for instance, by the catching of a broken or splintered cleat—the operating parts of the machine will not be damaged.

Mounted upon the shaft 18 is a collar 60, secured by a key 61 and having upon one end an arm 62, and in its outer surface is formed a semicircular notch or recess in which is mounted a half-round key or clutch-pin 63. An arm 64 is provided upon one end of the pin, and between the latter and the arm 62 is arranged a spring 74. Journaled upon the collar 60 is a sleeve 65, having upon its inner surface a series of notches 66, adapted to engage the edge of the clutch-pin when the arm 64 is released, and as one of the said notches is brought into register with the pin the latter is allowed to revolve slightly in its socket, its edge engaging the side of the notch, as shown in dotted lines, Fig. 7, causing the collar 60 on the shaft to be revolved with the sleeve 65 until the pin is released by the engagement of the arm 64 with the finger 72. Arranged upon the exterior of the sleeve and at one side is a flange 67, and coöperating therewith and encircling the sleeve is a ring 68, adjustably secured to the sleeve by bolts 69, and between the flange on the sleeve and ring projects a flange 70, formed upon the inner side of the gear 17 and having upon its opposite sides rings 71, of leather or other fibrous material, adapted to permit frictional engagement between the gear and sleeve, which may be regulated as desired by an adjustment of the ring 68.

Figure 8:
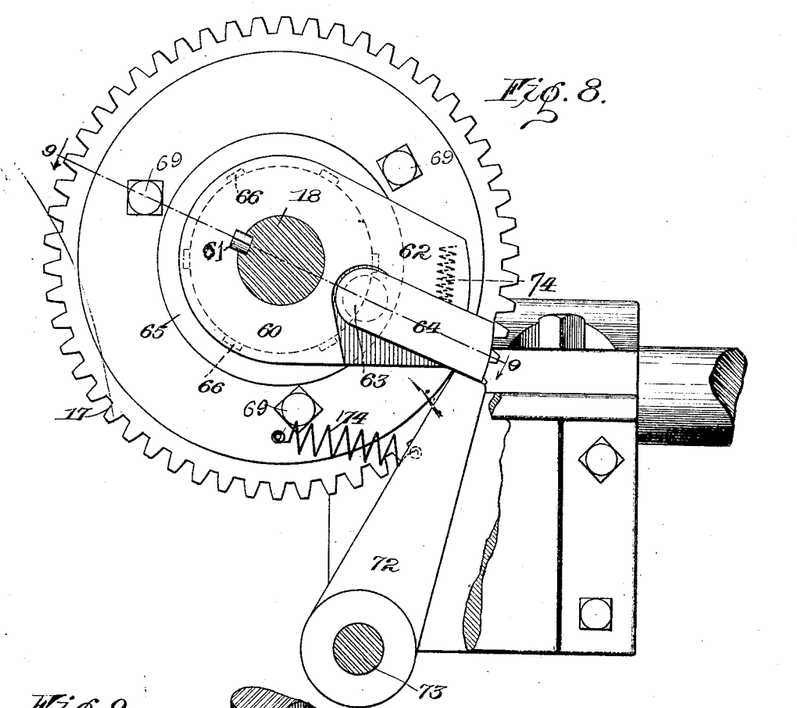
Fig. 8 is a sectional view on the line 8 8 of Fig. 5, showing the driving-clutch.
Figure 9:
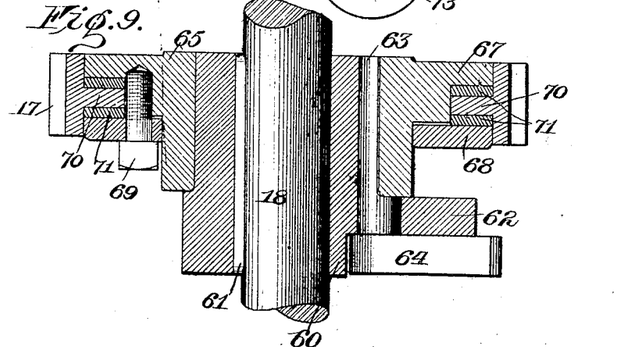
Fig. 9 is a cross-sectional view on the line 9 9 of Fig. 8.
Figures 10, 12:
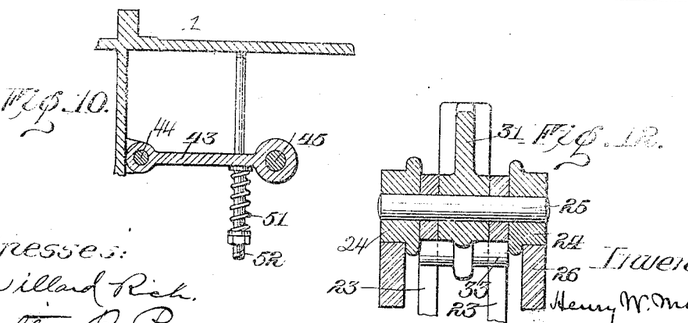
Fig. 10 is a cross-sectional view on the line 10 10 of Fig. 2.
Fig. 12 is a cross-sectional view on the line 12 12 of Fig. 11.
Figures 14, 16:
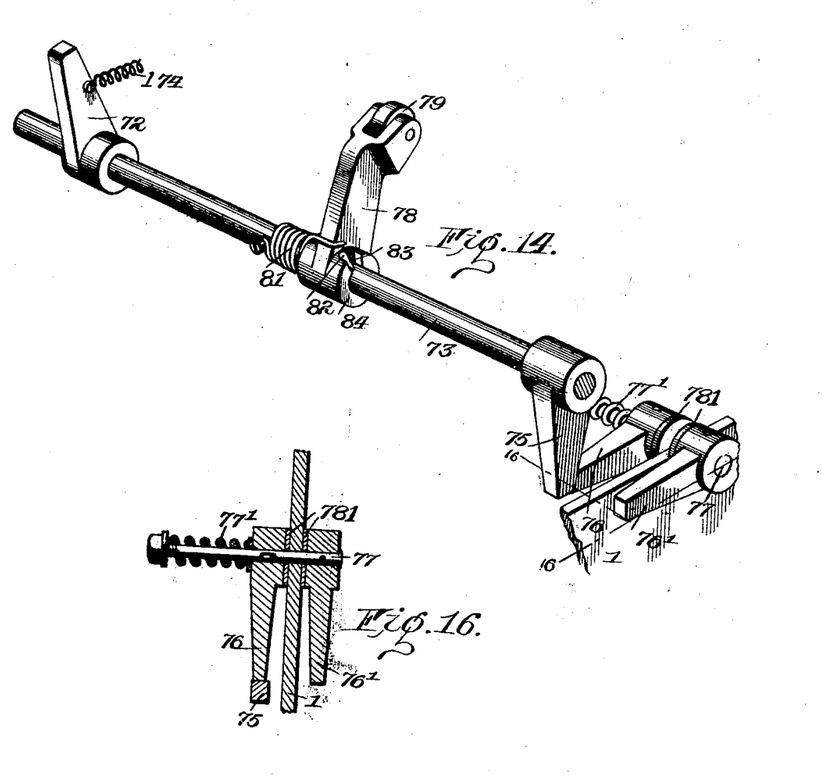
Fig. 14 is a perspective view of the rock-shaft and arms controlling the cleat-feeding devices.
Fig. 16 is a sectional view on the line 16 16 of Fig. 14.

In order to control the operation of the cleat-feeding mechanism, I provide a stop-finger 72, mounted upon a rock-shaft 73, journaled in the frame, and adapted to be moved out of the path of the arm 64 and normally held in the path of said arm by a light spring 174, as shown in Fig. 8, one end of which is connected to the side of the frame, as will be understood, the latter not being shown. Located upon the opposite end of the rock-shaft is a finger 75, arranged upon the inner side of the frame and adapted to coöperate with the end of a stop-finger 76, mounted upon a stud 77, journaled in the frame and carrying upon its outer end a similar finger or arm 76'. Suitable tension devices, such as a spring 77', encircling the stud and bearing against the hub on the finger 76, together with friction-washers 781, engaging upon opposite sides of the frame, are adapted to hold the fingers 76 76' in adjusted position thereon, and the latter may be easily moved into and out of engagement with the finger 75 by the foot of the operator. Mounted upon the rock-shaft 73 is a movable arm 78, carrying upon its upper end a roller 79, held in engagement with the face of a cam-plate 80 on the driven shaft 9 by means of a spring 81, surrounding the shaft and having one of its ends attached thereto and its opposite extremity connected to the arm 78. In order to allow a free movement of the arm 78 as the cam-plate 80 is revolved while the cleat-feeding mechanism is at rest and also allow the shaft 73 to be operated to remove the stop-finger 72 from engagement with the arm 64 when it is desired to feed a cleat, I arrange a pin 82 on the shaft and provide a slot 83 in the side of the hub 84, supporting the arm 78, permitting its movement independently of the rock-shaft when the latter is held stationary by the engagement of the fingers 75 and 76. The tension of the spring 81 is greater than that of the spring 174, so that when the rock-shaft is released by throwing up the finger 76 the shaft will be held by the spring 81 and allowed to rock with the movement of the arm 78, and overcoming the tension of the spring 174 the finger 72 will be intermittently moved out of the path of the arm 64, permitting the operation of the cleat-feeding mechanism until the finger or stop 76 is returned to the normal position and the movement of the rock-shaft is arrested. This arrangement of the parts permits the cleat-feeding mechanism to be thrown into and out of operation at the will of the operator and provides means for automatically controlling the operation of the cleat-feeding devices. The arrangement of the cam 80 is such that the feeding of the cleats will be properly timed relative to the movement of the nailing devices, and the clutch mechanism on the shaft 18 is so arranged that the shaft is arrested only when the cleat-feeding mechanism has completed its operation and is in the position to feed another cleat.

The table 2 is held stationary during the operation of the machine; but to adapt it for operation upon material of different thickness I mount it upon guides 90 upon the side of the frame 1 and provide adjusting-screws 91 for moving it relatively to nail-chucks, said screws being adapted to be revolved by any suitable means. As the movement required is comparatively slight, it is unnecessary to provide adjustable connections between the cleat-feeding devices, the vertical movement of the roller 50 being arranged enough in the first instance to be retracted below the face of the table when the latter is adjusted to accommodate the thickest boards.

In operating the machine the table 2 is adjusted by the screws 91 to allow the easy insertion of a cleat and the veneer or board constituting the side or end of the box between it and the nail-chucks 4. The operator first moves the finger 76 upward in the position shown in dotted lines in Fig. 7, releasing the rock-shaft 73, and by moving the treadle 95 downward with his foot the gear 10 is engaged with the shaft 9. The rock-shaft 73 being moved by the spring 81 through the roller 79 on the arm 78 bearing against the cam-plate carries the finger 72 out of the path of the arm 64, permitting the operation of the shaft 18 and the positioning of a cleat on the table against the stop 40. The veneer is then inserted over the cleat by the operator, and by the continued operation of the machine the nails are fed to the chucks 4 and driven by the downward movement of the driving-head 5. When it is desired to operate the nailing devices without feeding the cleats, the operator can return the finger 76 to the normal position and arrest the movement of the rock-shaft and disconnect the gear 17 and shaft 18, when the arm 78 will rock upon the shaft 73 as the cam 80 revolves without operating the finger 72; but by releasing the treadle 95 he can bring all of the parts to the position of rest upon the completion of their operation.

By arranging the parts so that the cleat-feeding devices and the nailing mechanism are actuated by a single driving-shaft and arranging suitable intermediate mechanism for controlling the feeding of the cleat relative to the nailing operation the proper relative operation of the parts is insured. The spring 81 between the cam 80 and the clutch controlling the connection of the cleat-feeding devices with the driving mechanism causes the operation of the clutch, and the latter is controlled by the cam 80, which causes the movement of the end of the spring attached to arm 78.

The arrangement of the parts as I have shown and described them adapts the machine particularly for forming the ends or sides of boxes which it is desirable to strengthen at one or more of their edges by a cleat or strip nailed thereon.

I claim as my invention—

1. The combination with a frame, a work-table thereon, nail-driving devices arranged above the table, a driving-shaft and an intermittently-driven shaft actuating said nail-driving devices, a cleat-support, and a feeding device operating over the latter to position a cleat upon the work-table, of intermittently-driven operating means connected to said cleat-feeding device actuated by the driving-shaft, and means operated by the driven shaft for controlling the operation of the cleat-feeding device.

2. The combination with a frame, a work-table thereon, and nail-driving devices arranged above the latter, a driving-shaft, an intermittently-driven shaft actuated therefrom, and a cleat-support arranged at the side of the work-table, of a cleat-feeding device operating over the support, intermittently-moving operating devices connected to the feeding device and operated from the driving-shaft, and a cam connected to the driven shaft and connections operated thereby to cause the movement of the feeding device to position a cleat prior to the nailing operation.

3. The combination with a frame, a work-table thereon, nail-driving devices supported above the table, a driving-shaft, and a driven shaft, of a cleat-support arranged at the side of the work-table, a cleat-feeding device, a rotary shaft for operating said device, and clutch devices arranged between the latter and the driving-shaft, of the cam operated by the driven shaft, and clutch-controlling devices operated by said cam.

4. The combination with a frame, a work-table thereon, nail-driving devices arranged above the table, a driving-shaft, and a driven shaft actuated therefrom and connected to the nailing devices, of a cleat-support arranged at the side of the table, feeding devices adapted to position a cleat upon the work-table, a shaft operating said devices, and a clutch connection between said shaft and the driving-shaft normally disengaged, a rock-shaft having the arm thereon for controlling the operation of the clutch, an arm on the rock-shaft, and a cam on the driven shaft engaged by said arm.

5. The combination with a frame having a work-table, nail-driving devices, a driving-shaft, a driven shaft actuated therefrom and connected to the nailing devices, and a cleat-support arranged at the side of the work-table, of a cleat-feeding device, a shaft mounted in the frame, connections between the shaft and the feeding device, and clutch connections between the said shaft and the driving-shaft normally disengaged, a rock-shaft having the finger controlling the operation of the clutch, the movable arm on the rock-shaft, and a stop for holding the rock-shaft stationary, a cam on the driven shaft operating the movable arm, and connections between the arm and rock-shaft, whereby the latter may be operated when released from the stop.

6. The combination with a frame, a work-table thereon, nailing devices, a driving-shaft and a driven shaft actuated thereby and connected to the nailing devices, and a cleat-support arranged at the side of the work-table, a feeding device, a shaft connected thereto, and clutch connections between the latter and the driving-shaft, of a rock-shaft having a finger controlling the operation of the clutch, a stop for arresting the movement of the rock-shaft, and a movable arm mounted upon the latter, a cam upon the driven shaft coöperating with the movable arm, connections between the latter and the rock-shaft whereby the shaft may be oscillated, and means for returning the finger to release the clutch upon the completion of the nailing operation.

7. In a nailing-machine having a driving-shaft, the combination with a driven shaft, nailing devices actuated by said shaft and a work-table having a slotted cleat-support at one side, of a feeding-arm provided with a finger adapted to engage a cleat, a guide upon the rear of the table, a presser adapted to engage the forward side of a cleat to hold it against the guide, and means operated by the driven shaft controlling the cleat-feeding devices.

8. The combination with a frame having driving and driven shafts, nailing devices actuated thereby, a work-table having a slotted cleat-support at one side and a guide on the support, of a feeding-arm supported on the guides and having a finger adapted to engage a cleat, a guide upon the rear of the table, a presser adapted to engage the forward side of a cleat to hold it in engagement with the guide and means operated by the driving-shaft for controlling the operation of the feeding-arm and retracting the presser below the table after the cleat has been positioned.

9. The combination with a frame having driving and driven shafts, nailing devices actuated thereby, a work-table having a slotted cleat-support and guides arranged upon the lower side of the support, of a feeding-arm supported at one end upon the guides and having a finger, a cleat-guide upon the rear of the table, and operating devices connected to the driving-shaft and operating the arm, a presser movable relative to the guide adapted to engage the forward side of a cleat, a movable bearing supporting the presser and means for retracting the latter after the cleat has been positioned.

10. The combination with a frame provided with a work-table having a slotted cleat-support, a driving-shaft, nailing devices actuated thereby, and a cleat-feeding arm operating beneath the table, of a guide upon the rear side of the latter, a wing pivoted to the table carrying a vertically-moving presser and permitting its movement relatively to the guide, operating devices connected to the driving-shaft for operating the feeding-arm, and means controlled by said devices for retracting the presser beneath the guide after a cleat has been positioned.

11. The combination with a frame provided with a work-table having a cleat-support at the side thereof, a driving-shaft, nailing devices actuated thereby, and a cleat-feeding arm operating beneath the table, of a shaft operated by the driving-shaft having a cam, and connections between the shaft and feeding-arm, a wing pivoted beneath the table, a vertically-movable presser carried thereon having a roller upon its upper end, and connections between the presser and the cam for retracting the former after a cleat has been positioned.

12. The combination with a frame having a work-table provided with a slotted cleat-support at the side thereof, a driving-shaft, nailing devices actuated thereby and guides arranged beneath the support, of a feeding-arm supported on the guides having a finger operating through the slot, a lever pivoted to the frame and connected to the arm, and an operating-shaft, connections between the latter and the lever, means for operating the shaft by the movement of the driving-shaft, a wing pivoted to the table and carrying a vertically-movable presser having a roller upon its upper end, a cam mounted upon the operating-shaft, and the lever coöperating therewith and connected to the presser for retracting the latter.

13. The combination with a frame having a work-table provided with a cleat-support, a driving-shaft, a driven shaft operated thereby having a cam, and nailing devices connected to the driven shaft, of a cleat-feeding device, a shaft connected thereto and a clutch arranged between the latter and the driving-shaft having a stop-arm for releasing it and arresting the movement of the clutch, a rock-shaft having a finger normally engaging the clutch-arm and provided with a stop-finger and an adjustable stop on the frame under the control of the operator adapted to engage the stop-finger, a spring for retaining the rock-shaft in normal position when the stop is released, a movable arm mounted upon the rock-shaft engaging the cam on the driven shaft, and connection between the arm and shaft, whereby the latter is operated through the movement of the cam when the stop is released.

14. The combination with a machine embodying nail-driving mechanism, and a cleat-feeding device therefor, of an intermittently-operating shaft for actuating the nailing devices, an intermittently-operating shaft for causing the operation of the cleat-feeding devices, an automatic clutch device for controlling the cleat-feeding devices, and a cam connected to the shaft of the nailing device for controlling said feeding devices.

15. The combination with a nailing-machine, an operating-shaft therefor having a cam, and means for feeding cleats to the nailing-machine, of operating devices for the cleat-feeding means, and a clutch controlling them, clutch-operating devices actuated by the cam on the nailing-machine-operating shaft and operating devices arranged between the cam and clutch.

16. The combination with a nailing-machine, means for actuating it and a cam operated thereby, of a cleat-feeder, a driving means therefor, and a clutch between the cleat-feeder and driving means, an arm controlling the clutch, a second arm actuated by the cam and having a limited independent movement relatively to the first-mentioned arm and a spring connection between the arms.

17. The combination with a nailing-machine, means for actuating it, and a cam operated thereby, of a cleat-feeder, a driving means therefor and a clutch between the cleat-feeder and driving means, an arm controlling the clutch, a second arm actuated by the cam and having a limited independent movement relatively to the first-mentioned arm, a spring connection between the arms and a stop under the control of the operator for regulating the movement of the arms.

18. The combination with a nailing-machine, means for actuating it, and a cam operated thereby, of a cleat-feeder, a driving means therefor and an automatic clutch between said means and the feeder, an arm automatically operated in one direction to control the clutch, a second arm coöperating with and actuated by the cam having a limited movement relatively to the clutch-controlling arm, a spring connection between said arms and means for governing the operation of the clutch-controlling arm.

19. The combination with a work-support, a cleat-guide at the rear of the work-support having the inclined grooves, of a presser-roller inclined relative to the work-support and movable above and below said support, and means for feeding boards or cleats between the guide and roller.

20. The combination with a work-support, of a cleat-guide at the rear of the support, a removable cleat-presser in front of the guide, and cleat-feeding devices operable between the guide and presser.

21. The combination with a work-support, of a reciprocating cleat-feeder movable laterally of the support, a cleat-guide at the rear, a movable presser at the front, and a driving means for reciprocating the feeder and elevating and depressing the presser.

22. The combination with a work-support, and a cleat-guide thereon, of a reciprocating cleat-feeder, a vertically-movable cleat-presser, a shaft, and connections between said shaft and the feeder and presser for reciprocating the former and operating the latter vertically relatively to the support.

23. The combination with a work-support, and nail-drivers, and operating devices therefor, of the cleat-feeder movable laterally of the support, operating devices for the feeder, a cam operated by the driver-operating devices for controlling the time of operation of the feeder relatively to the driving operation, and means under the control of the operator for regulating the operation of the feeding devices independently of the movement of the cam.

24. The combination with a work-support having a cleat-guide thereon, and nail-driving devices, of a reciprocating cleat-feeder having a pawl thereon to engage a cleat and operating to feed cleats beneath the nail-driving devices, a crank operating the feeder, and a removable pressing device for holding the cleat during the nailing operation.

HENRY W. MORGAN.

Witnesses:
G. WILLARD RICH,
G. A. RODA.